United States Patent [19]

Thomsen

[11] 4,034,962

[45] July 12, 1977

[54] ELECTRICAL FISH TAPE REEL

[75] Inventor: Wayne Thomsen, Grand Rapids, Minn.

[73] Assignee: Lawrence Peska Associates, Inc., New York, N.Y. ; a part interest

[21] Appl. No.: 711,122

[22] Filed: Aug. 3, 1976

[51] Int. Cl.² .......................................... E21C 29/16
[52] U.S. Cl. ..................................... 254/134.3 FT
[58] Field of Search .................... 242/106, 96, 199; 254/134.3 FT

[56] References Cited

U.S. PATENT DOCUMENTS

| | | | |
|---|---|---|---|
| 2,855,717 | 10/1958 | Heil | 242/96 |
| 3,095,159 | 6/1963 | Stacy et al. | 242/96 |
| 3,751,043 | 8/1973 | Bracci | 242/199 |

*Primary Examiner*—Al Lawrence Smith
*Assistant Examiner*—Robert C. Watson

[57] ABSTRACT

An electrical fish tape reel is disclosed comprising a stationary base having a spindle revolvably mounted thereon, a plate such as a disc being secured to the spindle and a handle being attached to the outer face of the plate. The base is arranged to lie on a flat surface such as a workbench, floor and the like so that the reel may be used unattended.

5 Claims, 3 Drawing Figures

ELECTRICAL FISH TAPE REEL

SUMMARY OF THE INVENTION

The present invention relates to an electrical fish tape reel comprising a stationary base lying in a plane and having an inner face and an outer face. The outer face is adapted for positioning on a flat surface such as a floor, table, workbench and the like. The spindle is revolvably mounted on its longitudinal axis transversely on the inner face of the base. A plate lying in a plane and having an inner face and an outer face is also provided, the plate being secured to the spindle transversely to the longitudinal axis of the spindle. The plate projects outwardly from the longitudinal axis of the spindle towards the periphery of the base to define a space between the base and the plate for reeling and paying out electrical fish tape wound on the spindle. A handle is secured to the outer face of the plate for rotating the spindle.

The inner face of the plate slopes away from the spindle and towards the periphery of the plate so that the space between the base and the plate tapers inwardly from the periphery of the plate to the spindle.

The spindle is secured to the base through a flange projecting inwardly from the periphery of the spindle towards the axis of the spindle and for engaging an outwardly projecting flange mounted on the base for revolvably mounting the spindle on the base.

An anti-friction coating is provided for covering at least one of the inner faces of the base or the plate. The anti-friction coating is preferably on the inner face of the base. The anti-friction coating may comprise a poly (fluoroethylene) such as Teflon (TM) and the art known equivalents thereof.

DETAILED DESCRIPTION

Figure 1:
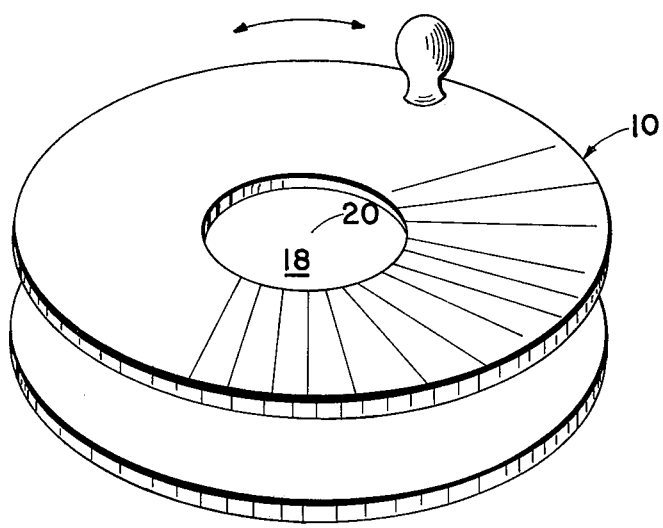
FIG. 1 comprises a perspective view of an electrical fish tape reel having a stationary base, a spindle revolvably mounted on the base and a plate projecting outwardly from the spindle to define a space between the periphery of the plate and the periphery of the base for receiving or paying out electrical fish tape wound on the spindle according to one embodiment of the present invention.
Figure 2:
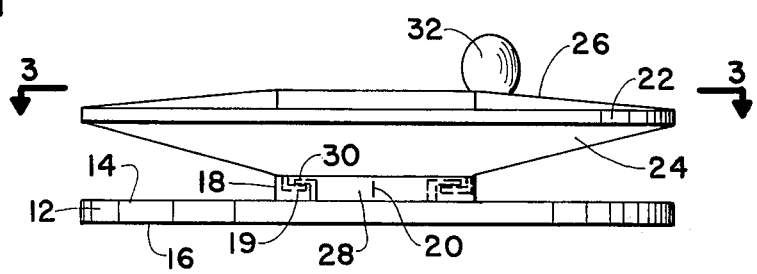
FIG. 2 comprises a side elevation of the electrical fish tape reel illustrated in FIG. 1.
Figure 3:
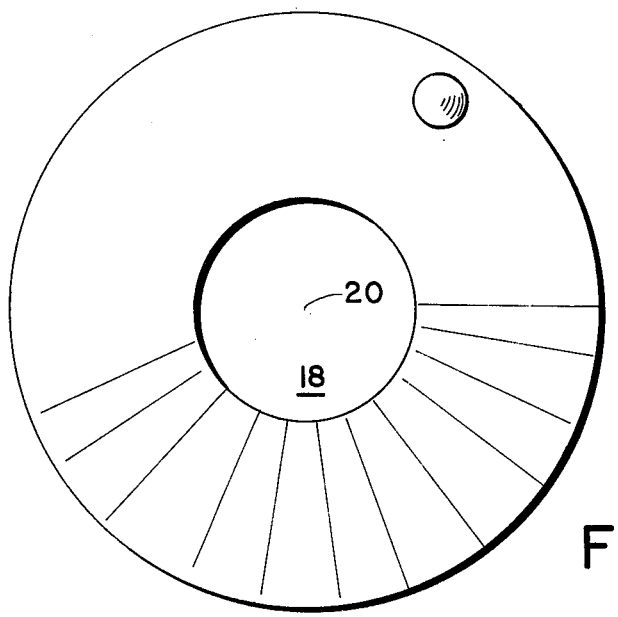
FIG. 3 comprises a plan view taken along the line 3—3 of FIG. 2.

Electrical fish tape reels are disclosed in the prior art U.S. Pat. Nos. 3,582,044 Gardner; 3,568,947 Oprins; 3,549,127 Niemann; 3,528,644 Scott; 3,424,435 Niemann; 3,067,984 Linden; 2,969,953 Shaw, Jr. and 2,913,222 Kuzara.

All of the aforementioned prior art patents disclose electrical fish tape reels which require an operator to hold the reel when in use for paying out fish tape. Specifically, each of the foregoing references discloses a device on a fish tape reel which has to be operated manually when the reel is in use which is inefficient since the operator's time may be better spent in other work.

It is therefore an object of the present invention to overcome these and other difficulties encountered in the prior art.

It is a further object of the present invention to provide a novel electrical fish tape reel.

It is also an object of the present invention to provide an electrical fish tape reel which may be utilized to pay out electrical fish tape unattended by an operator.

These and other objects have been achieved by the present invention and will become apparent from the disclosure and claims that follow as well as the appended drawing.

Referring to the drawing, an electrical fish tape reel 10 is illustrated comprising a stationary base 12 lying in a plane and having an inner face 14 and an outer face 16. The outer face 16 is adapted to be mounted on a flat surface such as a floor, table, and the like. A spindle 18 is revolvably mounted on its longitudinal axis 20 transversely on the inner face 14 of base 12. A plate 22 lying in a plane and having an inner face 24 and an outer face 26 is secured to the spindle. Longitudinal axis 20 is coincidental with and common to the longitudinal axis of a spindle receiving member 28 secured to base 12. The inner face 24 of plate 22 slopes away from spindle 18 and towards the periphery of plate 22 so that the space between the base 12 and the plate 22 tapers inwardly from the periphery of the plate 22 to the spindle 18. The spindle 18 is secured to base 12 through a flange 19 projecting inwardly towards the longitudinal axis 20 of spindle 18 for engaging an outwardly projecting flange 30 mounted on spindle receiving member 28 thereby providing means for revolvably mounting the spindle 18 on the base 12.

The mounting of plate 22 with respect to base 12 whereby the plate 22 projects outwardly from a longitudinal axis 20 of spindle 18 towards the periphery of the base defines a space between the base 12 and the plate 22 for reeling in and paying out electrical fish tape wound on spindle 18. A handle member 32 is secured to the outer face 26 of the plate 22 for rotating the spindle 18. In one embodiment at least one of the inner faces 14 or 24 and preferably inner face 14 of base 12, is coated with an anti-friction compound known in the art such as a poly (fluoroethylene) known in the art as Teflon (TM) and its art-known equivalents.

In use, the base 12 is positioned either on a floor or table and electrical fish tape is secured to spindle 18 in a manner known in the art by a mechanical fastener or by friction wrapping of the electrical fish tape around the spindle 18 until the first few turns of the electrical fish tape are sufficiently bound to the spindle 18 so that rotating the spindle will not cause any slippage of the electrical fish tape on the spindle 18. The balance of the electrical fish tap may then be wound onto the spindle 18 and taken up in the space between the outer edge of spindle 18 and the periphery of plate 22. When the electrical fish tape is ready for use, the fish tape reel 10 may be positioned on a floor, table, a workbench and the like and the fish tape payed out from the reel while the reel 10 is unattended. A workman does not have to rotate the reel or stand over the reel to assure that fish tape is being properly payed out therefrom as is the case with the devices described in the prior art noted herein.

Although the invention has been described by reference to some embodiments it is not intended that the novel fish tape reel be limited thereby but that modifications thereof are intended to be included as falling within the broad scope and spirit of the foregoing disclosure, the following claims and the appended drawing.

What is claimed is:

1. An electrical fish tape reel comprising a stationary base lying in a plane and having an inner face and an outer face, said outer face of said base being adapted for positioning on a flat surface, a spindle revolvably mounted on its longitudinal axis transversely on said inner face of said base, a plate lying in a plane and having an inner face and an outer face, said plate being secured to said spindle transversely to the longitudinal axis of said spindle, said plate projecting outwardly from said longitudinal axis of said spindle towards the periphery of said base to define a space between said base and said plate for reeling in and paying out electrical fish tape wound on said spindle, said space between said base and said plate tapering inwardly from the periphery of said plate toward said base, said spindle being secured to said base through first flange means for engaging second flange means mounted on said base for revolvably mounting said spindle on said base.

2. The electrical fish tape reel of claim 1 further comprising an anti-friction coating covering at least one of said inner faces of said base and said plate.

3. The electrical fish tape reel of claim 2 where said anti-friction coating is on said inner face of said base.

4. The electrical fish tape reel of claim 2 where said anti-friction coating comprises a poly (fluoroethylene).

5. The electrical fish tape reel of claim 3 where said anti-friction coating comprises a poly (fluoroethylene).